United States Patent
Kresta et al.

(10) Patent No.: US 6,518,324 B1
(45) Date of Patent: Feb. 11, 2003

(54) POLYMER FOAM CONTAINING NANOCLAY

(75) Inventors: Jiri E. Kresta, Warren, MI (US);
Jinhuang Wu, Norristown, PA (US);
Richard M. Crooker, Fogelsville, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 68 days.

(21) Appl. No.: 09/723,858

(22) Filed: Nov. 28, 2000

(51) Int. Cl.[7] .............................................. C08G 18/08
(52) U.S. Cl. .............................. 521/83; 521/86; 521/91; 521/99; 521/100; 521/110; 521/111; 521/112; 521/122; 521/123; 521/124; 521/155; 521/170; 521/142
(58) Field of Search .............................. 521/83, 86, 91, 521/99, 100, 110, 111, 112, 122, 123, 124, 155, 170, 142

(56) References Cited

U.S. PATENT DOCUMENTS

| | | | | |
|---|---|---|---|---|
| 4,558,075 A | * | 12/1985 | Suss et al. | 523/216 |
| 5,207,830 A | * | 5/1993 | Cowan et al. | 106/672 |
| 6,020,387 A | * | 2/2000 | Downey et al. | 521/122 |
| 6,117,541 A | * | 9/2000 | Frisk | 428/327 |
| 6,271,297 B1 | * | 8/2001 | Ishida | 523/223 |

FOREIGN PATENT DOCUMENTS

| | | | |
|---|---|---|---|
| EP | 0388952 | * | 9/1990 |
| WO | 00/47657 | * | 8/2000 |

* cited by examiner

Primary Examiner—John M. Cooney, Jr.
(74) Attorney, Agent, or Firm—William D. Mitchell

(57) ABSTRACT

Polymer foams containing nanoclay are provided, the foams having improved properties such as thermal insulation values.

4 Claims, No Drawings

POLYMER FOAM CONTAINING NANOCLAY

BACKGROUND OF THE INVENTION

This invention relates to polymer foams containing nanoclay, more particularly to improvements in the properties of polymeric foams by dispersing nanoclay into the polymer foam compositions.

CFC (chlorofluorocarbon) foam blowing agents such as CFC-11 and CFC-12 provide rigid foams with excellent insulation properties, dimensional stability and fire performance. The use of CFCs has been phased out, however, because they are considered to be detrimental to the ozone layer. The blowing agent alternatives now in use for polymer foams, HCFCs (hydrochlorofluorocarbons), HFCs (hydrofluorocarbons) and HCs (hydrocarbons), generally can not achieve foams having similar properties. For example, the insulation properties are generally poorer because the alternative blowing agents have higher thermal conductivity than CFCs.

It would therefore be useful to provide the industry with a means of improving polymer foams, especially in terms of insulation values.

BRIEF SUMMARY OF THE INVENTION

Polymer foam compositions, such as polyurethane foam compositions, are provided which comprise up to about 10 weight % of nanoclay dispersed therein, based on total polymer weight, as well as the resulting polymer foams.

DETAILED DESCRIPTION

It has now been found that integration of nanoclay into the polymer foam composition results in foams having improved properties. Not only are thermal insulation properties improved (both in terms of initial and aged k-factors), but the resulting foams have a fine cell structure, believed to result from the nanoclay acting as a nucleating agent in the foam process. The slow aging rate of the foams suggests that the nanoclay also acts as a gas barrier reducing the infusion of air into the foam cells and diffusion of the blowing agents out of the foam cells.

Nanoclays (nanosized clays) are plate-like materials, the clay mineral being generally selected from smectite, vermiculite and halloysite clays. The smectite clay in turn can be selected from montmorillonite, saponite, beidellite, nontrite, hectorite and mixtures thereof. A preferred clay mineral is the montmorillonite clay, a layered aluminosilicate. The nanoclay platelets generally have a thickness of about 3–1000 Angstroms and a size in the planar direction ranging from about 0.01 micron to 100 microns. The aspect ratio (length versus thickness) is generally in the order of 10 to 10,000. These clay platelets are separated by a gallery, a space between parallel layers of clay platelets containing various ions holding platelets together. One such material is Cloisite® 10A (available from Southern Clay Products), its platelets having a thickness of about 0.001 micron (10 Angstroms) and a size in the planar direction of about 0.15 to 0.20 micron.

The invention is applicable to both thermoset and thermoplastic polymer foams. Thermoset polymers include polyurethane, polyisocyanurate and phenolic resins, while thermoplastics include polystyrene, polypropylene, polyethylene and polyvinyl chloride resins.

Any conventional blowing agent can be used, such as HFCs, HCFCs, HCs or mixtures thereof. HCFC-141b (1,1-dichloro-1-fluoroethane) is illustrated in the example below.

The nanoclay should be dispersed uniformly in one or more components of the polymer foam composition. This may be done by conventional techniques such as milling or extruding. Or, as in the example below, the nanoclay can be dispersed into the blowing agent using an ultrasonic water bath.

The amount of nanoclay generally ranges from about 0.01 part to about 10 parts of 100 parts by weight of total (polymer) resin.

The other components of the foam formulations may be those which are conventionally used, which components and their proportions are well known to those skilled in the art.

The practice of the invention is illustrated in more detail in the following non-limiting example in which polyurethane foam was made without and with 0.2 part Cloisite® 10A. The two formulations used (each having an Iso Index of 264) each contained 167.9 parts Papi 27, a polymeric methane diphenyl diisocyanate (polyMDI) available from Dow Chemicals; 100 parts T-2541, a polyester polyol having a hydroxyl number of 240 available from Kosa; 3 parts Dabco TMR-4, a trimerization catalyst available from Air Products; 3 parts of B-8433, a polysiloxane polyether copolymer surfactant available from Goldschmidt Chemical Corporation; 0.5 part water; and 40 parts 141b blowing agent; all parts are by weight.

For the foam without nanoclay, B-side materials (polyol, water, 141b, catalyst and surfactant) were mixed in a container, followed by addition of the A-side (polyMDI). The mixture was vigorously stirred and poured into a box.

For the foam with nanoclay, B-side materials (polyol, water, catalyst and 50% of the surfactant) were mixed in one container and A-side materials (polyMDI, 50% of the surfactant, Cloisite® 10A dispersed in a portion of the 141b, and the remainder of the 141b) were mixed in a second container, after which the two sides were mixed together, vigorously stirred and poured into a box.

In order to compare the relative thermal conductivity of the foams, k-factor tests were conducted according to ASTM-C-518, both initially and after aging at room temperature for three months. The foam without nanoclay gave initial and aged k-factors (in $Btu.in/ft^2.h.F$) of 0.139 and 0.193, while the foam with nanoclay gave initial and aged k-factors of 0.135 and 0.182, showing that the nanoclay results in better initial insulation values and that the improvement increases on aging.

We claim:

1. A polymer foam composition containing up to about 10 weight % of nanoclay dispersed therein, based on the total weight of polymer, said nanoclay containing platelets having a thickness of about 3–1000 Angstroms and a size in the planar direction of about 0.01 to 100 microns.

2. A polymer foam made from the composition of claim 1.

3. A polyurethane foam composition containing up to about 10 weight % of nanoclay dispersed therein, based on the total weight of polyurethane, said nanoclay containing platelets having a thickness of about 3–1000 Angstroms and a size in the planar direction of about 0.01 to 100 microns.

4. A polyurethane foam made from the composition of claim 3.

* * * * *